US010548087B2

(12) United States Patent
Wang et al.

(10) Patent No.: US 10,548,087 B2
(45) Date of Patent: Jan. 28, 2020

(54) TECHNIQUES FOR MANAGING IDLE STATE ACTIVITY IN MOBILE DEVICES

(71) Applicant: Intel Corporation, Santa Clara, CA (US)

(72) Inventors: Shaocheng Wang, Los Angeles, CA (US); Muthaiah Venkatachalam, Beaverton, OR (US); Xiangying Yang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/948,907

(22) Filed: Apr. 9, 2018

(65) Prior Publication Data

US 2018/0227852 A1 Aug. 9, 2018

Related U.S. Application Data

(63) Continuation of application No. 14/951,285, filed on Nov. 24, 2015, now Pat. No. 9,942,850, which is a
(Continued)

(51) Int. Cl.
*H04M 1/00* (2006.01)
*H04W 52/02* (2009.01)
*H04W 4/70* (2018.01)
*H04B 7/26* (2006.01)
*H04L 5/00* (2006.01)
*H04W 28/02* (2009.01)
(Continued)

(52) U.S. Cl.
CPC ...... *H04W 52/0251* (2013.01); *H04B 7/2656* (2013.01); *H04L 5/001* (2013.01);
(Continued)

(58) Field of Classification Search
CPC ..... H04W 4/70; H04W 4/02; H04W 28/0205; H04W 52/0251; H04W 72/0486;
(Continued)

(56) References Cited

U.S. PATENT DOCUMENTS 6,349,210 B1* 2/2002 Li ................... H04L 12/1868
370/329
7,933,221 B1* 4/2011 Pawar ............... H04L 41/5022
370/235
(Continued)

FOREIGN PATENT DOCUMENTS

CN 1988710 A 6/2007
CN 101461179 A 6/2009
(Continued)

*Primary Examiner* — Mahendra R Patel

(57) ABSTRACT

An apparatus may comprise a radio-frequency (RF) transceiver and a message aggregation module arranged to intercept multiple messages from one or more mobile data applications during an idle mode of a device, one or more of the multiple messages operable to trigger a transition of the device from the idle mode to a connected mode by causing a radio resource control message to be sent from the device to a radio access network, the message aggregation module to store the multiple messages in a buffer associated with the one or more mobile data applications in order to maintain the device in the idle mode, and schedule for transmission by the RF transceiver the stored messages at a defined time instance based on a delay tolerance for the one or more mobile data applications when the device is in the connected mode. Other embodiments are disclosed and claimed.

23 Claims, 13 Drawing Sheets

Related U.S. Application Data continuation of application No. 13/976,955, filed as application No. PCT/US2011/067408 on Dec. 27, 2011, now Pat. No. 9,338,748.

(60) Provisional application No. 61/450,070, filed on Mar. 7, 2011.

(51) Int. Cl.
*H04W 72/04* (2009.01)
*H04W 8/18* (2009.01)
*H04W 88/08* (2009.01)

(52) U.S. Cl.
CPC ......... *H04W 4/70* (2018.02); *H04W 28/0205* (2013.01); *H04W 72/0486* (2013.01); *H04L 5/0033* (2013.01); *H04W 8/186* (2013.01); *H04W 72/048* (2013.01); *H04W 88/085* (2013.01)

(58) Field of Classification Search
CPC ..... H04W 28/02; H04W 72/04; H04W 52/02; H04W 8/186; H04W 88/085; H04W 72/048; H04B 7/2656; H04B 7/26; H04L 5/001; H04L 5/00; H04L 5/0033; G06F 13/24; G06F 13/385; G06Q 40/00; H04Q 7/20; G09B 5/062
USPC ....... 455/574, 404.1, 522; 1/1; 370/328, 338
See application file for complete search history.

(56) References Cited

U.S. PATENT DOCUMENTS

| | | | | |
|---|---|---|---|---|
| 8,588,189 B2* | 11/2013 | Lee | ................... | H04W 72/1242 370/329 |
| 9,055,589 B2* | 6/2015 | Deu-Ngoc | ............. | H04W 76/36 |
| 2002/0019853 A1* | 2/2002 | Vange | ................... | G06F 9/5027 709/207 |
| 2002/0196785 A1* | 12/2002 | Connor | ................... | H04L 47/10 370/392 |
| 2004/0119814 A1* | 6/2004 | Clisham | ................. | H04N 7/141 348/14.08 |
| 2005/0249227 A1* | 11/2005 | Wang | ...................... | H04L 47/10 370/412 |
| 2005/0281278 A1* | 12/2005 | Black | ..................... | H04L 1/0002 370/412 |
| 2006/0146721 A1* | 7/2006 | Attar | ..................... | H04L 1/0002 370/238 |
| 2008/0049772 A1* | 2/2008 | Faniuolo | ................. | H04L 47/10 370/412 |
| 2008/0151775 A1* | 6/2008 | Balint | .................. | H04L 1/1887 370/253 |
| 2008/0301322 A1* | 12/2008 | Horibe | .................... | H04L 12/12 709/245 |
| 2009/0279489 A1* | 11/2009 | Deu-Ngoc | ............. | H04W 72/10 370/329 |
| 2010/0002699 A1* | 1/2010 | Carpio | ................ | H04L 12/1877 370/392 |
| 2010/0183027 A1* | 7/2010 | Mueller | ................ | H04L 1/0025 370/468 |
| 2012/0099429 A1* | 4/2012 | Ludwig | ................. | H04L 43/028 370/235 |

FOREIGN PATENT DOCUMENTS

| | | | | |
|---|---|---|---|---|
| CN | 101488966 A | * | 7/2009 | ......... H04L 41/5019 |
| CN | 101621546 A | * | 1/2010 | ......... H04L 12/1877 |
| CN | 101854294 A | | 10/2010 | |
| JP | 11225161 A | * | 8/1999 | |
| JP | 2001320410 A | * | 11/2001 | |

* cited by examiner

TECHNIQUES FOR MANAGING IDLE STATE ACTIVITY IN MOBILE DEVICES

RELATED APPLICATION

This application is a continuation of, claims the benefit of and priority to previously filed U.S. patent application Ser. No. 14/951,285 filed Nov. 24, 2015, which is a continuation of U.S. patent application Ser. No. 13/976,955 filed Jun. 27, 2013 (now U.S. Pat. No. 9,338,748 issued May 10, 2016), which is a U.S. National Phase Entry for PCT/US2011/067408 filed Dec. 27, 2011, which claims the benefit of U.S. Provisional Patent Application Ser. No. 61/450,070 filed Mar. 7, 2011; all of which are incorporated herein by reference in their entirety.

BACKGROUND

In the present day, mobile communications devices are replete with mobile data applications including so called "always on" application that may send periodic messages to keep an application session "alive" between different devices that may be remotely connected to one another. In addition, other applications may generate status update messages periodically that provide messages between remotely coupled devices. These type of messages may be generated even when a mobile communication device is otherwise inactive, leading to frequent transitions between idle and active states, which may unduly consume device power.

It is with respect to these and other considerations that the present improvements have been needed.

DETAILED DESCRIPTION

Figure 1:
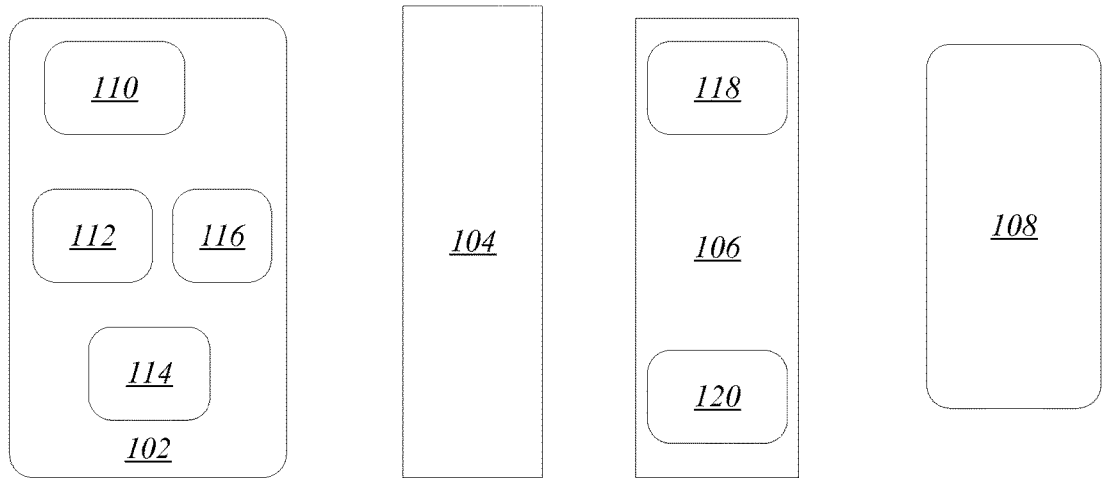
FIG. 1 depicts a system consistent with various embodiments.

Various embodiments are related to reducing frequent idle and active transitions that may occur in mobile devices, and, in particular, to reducing the frequency of content and presence status update messages, as well as keep-alive messages, that are generated by mobile data applications.

In various embodiments, the messages may be carried by an operator that manages a radio access network and core network to provide data to and from the mobile device. Some embodiments of a communications system may be implemented with a radio technology such as the Institute of Electrical and Electronics Engineering (IEEE) 802.16 (Wi-MAX), IEEE 802-20, the 3rd Generation Partnership Project (3GPP) Evolved Universal Mobile Telecommunication System (UMTS) Terrestrial Radio Access (UTRA) (E-UTRA), among others. IEEE 802.16m is an evolution of IEEE 802.16e, and provides backward compatibility with an IEEE 802.16-based system. The UTRA is a part of UMTS. The 3GPP long term evolution (LTE) is a part of an evolved UMTS (E-UMTS) using the E-UTRA. LTE-advance (LTE-A) is an evolution of the 3GPP LTE. As used herein, any reference to the term "LTE" includes any version of LTE, including LTE-A and its revisions, progeny, and variants. The embodiments are not limited in this context.

In the present day, devices such as smart phones, tablet computing devices, and other devices, can support a multitude of mobile data applications that may number in the hundreds of thousands. Many of the applications on mobile devices utilize broadband connections provided to link mobile devices to provide various types of communications to the mobile device. While some applications employ more traditional use modes, such as web browsing and electronic mail reading, mobile devices often are configured with newly emerging applications including social networking applications that allow the user to "stay connected" with other users.

At present some existing "always on" mobile data applications involve interactive communications, through an operator network, with their application servers in the internet. The server and the application resident on a mobile device (UE) periodically exchange "heartbeat" messages (also known as keep-alives) to keep the application session alive and also to avoid the expiration of network address translation (NAT) mapping, which causes IP session disconnection.

In addition to periodic keep-alive messages, mobile data applications may also generate frequent status update messages to notify the users of status updates relating to the application. Some examples include presence information of buddies in an instant messaging (IM) buddy list, update of user location upon user "check in", update of "Facebook likes" to a user's friends, etc.

Thus, in order to facilitate maintaining connection between a mobile device and another device, various mobile data applications may generate frequent communications, such as status update messages or keep-alive signals, even if no other data or content is to be transmitted at the time of such messages. These communications in turn may cause a mobile device to frequently transition between idle and active mode in order to deliver the communications scheduled by a given mobile data application. For example, to prevent the loss of its connection, a voice over internet protocol (VoIP) application running in a mobile device typically needs to wake up periodically and check in with its server. In particular, VoIP applications such as Skype™ and Fring™ may generate keep-alive messages at intervals ranging from every 30 seconds to every 8 minutes. In addition, social networking apps such as the Facebook® FindMe® application generate status update messages when the geographic position of a mobile device changes. The frequency of such messages may range from sporadic, such as upon changing location from home to work, to periodic, where the period may be as frequent as every 60 seconds.

The frequent sending of keep-alive or status update messages may thereby result in excessive signaling overhead in both a Radio Access Network (RAN) and Core Network (CN) used to carry the messages, and may consume excessive power at the mobile device, or "user equipment" (UE). In particular, various communications standards may require procedures that cause excessive power consumption and signaling to address such messages. For example, according to 3GPP TS 23.401 (3rd Generation Partnership Project; Technical Specification Group Services and System Aspects; General Packet Radio Service (GPRS) enhancements for Evolved Universal Terrestrial Radio Access Network (E-UTRAN) access (Release 10) (9/2011)) (hereinafter "TS 23.401"), the eNB (base station) may initiate an S1 release procedure to move a UE from an Evolved Packet System (EPS) Connection Management (ECM) state, such as ECM-CONNECTED state to an ECM-IDLE state, upon detection of user inactivity. As a result, when the average frequency of background messages is greater than the inactivity timer at eNB, the UE is required to cycle among idle, wakeup, re-establish the connection, deliver the update messages, go back to idle, in order to deliver these status update messages.

Moreover, various aspects involved in the typical operation of status update and/or keep alive messages may aggravate the extent of their impact on such features as signaling overhead and power consumption. Firstly, these messages can be mobile-originated (MO) or mobile-terminated (MT). For example, periodic FindMe messages can be triggered by the change of location of a second device of in communication with a user's device or may be triggered when the user's device changes location. Secondly, mobile devices often have installed multiple applications that each generates a status update, keep-alive, or similar message autonomously. As a result, the aggregate of status updates and keep-alive messages from multiple mobile data applications may cause non-negligible and frequent (e.g., every 30 sec to every few minutes) background traffic, even when a user performs no direct interaction with the mobile device.

In particular, the present embodiments address issues identified to update the present 3GPP standard (Technical Report 22.801, §§ 5.2, 6; 3rd Generation Partnership Project; Technical Specification Group Services and System Aspects; Study on non-MTC Mobile Data Applications impacts (Release 11) (08/2011)). In particular, several proposed improvements have been identified and are specified: 1) The network shall be able to provide the capability to reduce the overheads associated with the transport of huge volume of small data packets generated by non-MTC mobile data applications; 2) The definition of a small amount of data shall be configurable according to network operator policy; 3) The system shall be able to provide capabilities to minimize signaling surge caused by mobile data application behaviors such as keep-alives, status updates, instant messages etc.; 4) The system should be able to provide capabilities to classify the type of the packet generated by mobile data applications; 5) The system should be able to use optimized service delivery mechanisms for different types/classes of data application packets; 6) The system shall be able to provide mechanisms to optimize the traffic due to large number of live streaming sessions for the same content from a given source outside of the 3GPP network (e.g. merger of unicast streams delivering identical content); 7) Mechanisms shall be provided which allow the network and UE to detect abnormally high data patterns and to provide countermeasures to protect the network and subscribers from data surges that are caused, either intentionally (e.g. due to design) or accidentally (e.g. due to bad implementation), by Mobile Data Applications; 8) The system shall be able to provide mechanism to efficiently manage the delivery of simultaneous push services (e.g. by considering the network status and timing requirements associated with each push service).

In some embodiments, the impact of automatic generation of status update and keep-alive messages may be addressed by aggregating status update traffic at a network end and/or UE end to reduce the frequency of update/keep-alive messages sent across an air interface between a UE and network. This, in turn, may reduce the signaling overhead and UE power consumption associated with frequent active-idle transitions.

The present embodiments take advantage of the fact that many messages that are automatically generated by mobile data applications may be delay tolerant. In some embodiments, the transmission of messages generated by a given application, such as content and presence status update messages, may be delayed to an extent that is tolerable for a given application, while reducing the frequency of active-idle transitions in a mobile device hosting the application. In particular, it is to be noted that a large fraction of the content and presence status update messages from social networking applications (hereinafter also referred to as "apps") may be somewhat delay-tolerant in terms of the frequency with which such status update messages are transmitted. As a result, the present embodiments facilitate consolidating or aggregating multiple status update messages generated at different instances, so that some status update messages are not transmitted over the air when generated by an application. Instead, multiple status update messages generated by a mobile data application within a specified period of time may be stored and transmitted in a common batch.

In one embodiment, for example, an apparatus such as a UE may comprise a radio-frequency (RF) transceiver and a message aggregation module. The message aggregation module may be executed by a processing circuit to intercept multiple messages from one or more mobile data applications during an idle mode of a device. One or more of the multiple messages may trigger a transition of the device from the idle mode to a connected mode by causing a radio resource control message to be sent from the device to a radio access network. The message aggregation module may store the multiple messages in a buffer associated with the one or more mobile data applications in order to maintain the device in the idle mode, and schedule for transmission by the RF transceiver the stored messages at a defined time instance based on a delay tolerance for the one or more mobile data applications when the device is in the connected mode. Other embodiments are described and claimed.

FIG. 1 depicts a system 100 consistent with various embodiments. The architecture of system 100 includes a mobile device or user equipment (UE) 102, a radio access network (RAN) 104, a core network 106, and application server 108. The RAN 104 and core network 106 may be part of a single operator network that carries data to and from the UE 102. The application server 108 may be a public server coupled to a public network such as the internet. In the embodiment specifically illustrated in FIG. 1, the UE 102 includes a mobile data application 110, a middleware module 112, processor 114, and transceiver 116. The middleware module 112, whose operation is detailed below, may act to reduce the overall frequency of active-idle transitions that take place in UE 102 by reducing the frequency of messages sent over the air from UE 102 to RAN 104. The messages whose frequency is reduced by middleware module 112 may include background traffic messages generated by mobile data applications, such as status update messages and keep-alive messages.

In the embodiment of FIG. 1, the core network 106 includes known functions 118 and an aggregation/proxy module 120, whose operation is also detailed below. In some embodiments, the aggregation/proxy module 120 may serve to reduce the traffic of status update messages and keep alive messages directed to UE 102, thereby reducing the frequency with which the UE 102 receives such messages with the result that active-idle transitions in UE 102 are reduced. In various embodiments, the middleware module 112 and/or aggregation/proxy module 120 may aggregate background traffic messages to reduce the frequency of transmission of such messages either during periods when the UE 102 is idle or when the UE 102 is active. In the latter case, although aggregation of background traffic messages during an active period may not generally reduce frequency of active-idle transitions for the UE 102, signaling overhead may be reduced by reduced frequency of transmission of the background traffic messages.

Figure 2:
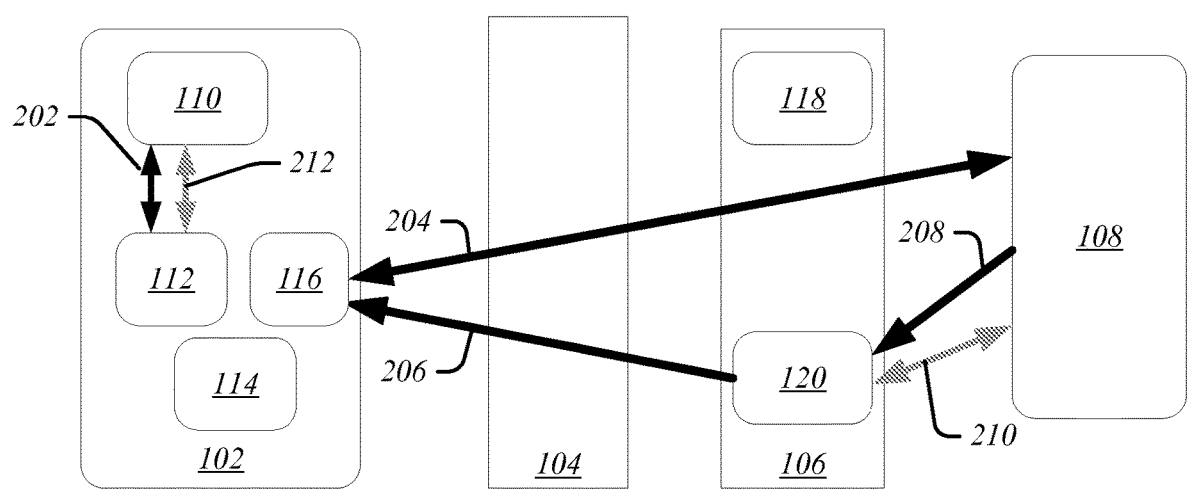
FIG. 2 depicts various messaging scenarios facilitated by the system of FIG. 1.

FIG. 2 depicts various messaging scenarios facilitated by the system 100. In some instances, mobile data application 110 may automatically generate messages either periodically at predetermined intervals, or upon detection of a triggering event, such as a change in geographical positions.

In embodiments in which mobile data application 110 is an application that generates status update message(s) 202, the status update messages 202 may be aggregated at the middleware module 112. The middleware module 112 may periodically send a message 204 to application server 108, in which message 204 may contain multiple status update messages 202 generated at different instances. This may serve to reduce the number of instances in which the UE 102 is transitioned between an active and idle state. It has been recognized by the present inventors that mobile data applications such as keep-alive messages and status update messages may exhibit a delay tolerance. The term delay tolerance, as used herein, refers to a period of time in which a message can be held by an entity, such as a UE, after being generated by an application, without delivery to the intended receiver, such as a server, in a manner that preserves operation of the application within tolerable limits.

In addition, the aggregation/proxy module 120 may serve to aggregate incoming messages, such as status update message(s) 208 that may be sent periodically or occasionally from application server 108. A message 206 may be sent from aggregation/proxy module 120 that includes multiple messages 208 that are sent at different instances by application server 108. For example, if the application server 108 is a social networking server, the application server 108 may push content and presence status update messages to a subscriber of UE 102, where the subscriber's friends perform an activity such as "liking" a particular article or "becoming a fan" of a particular group. The frequency of such content and presence update messages may be as often as every few minutes for a given mobile data application. Thus, aggregation of such messages into a single message 206 may also serve to reduce the number of instances in which the UE 102 is transitioned between an active and idle state, as explained further below.

Similarly, in embodiments in which mobile data application 110 generates keep alive messages 212, the keep alive messages 212 may be aggregated for sending multiple keep alive messages at a single instance from transceiver 116. Likewise, keep-alive messages 210 sent from application server 108 may be aggregated in aggregation/proxy module 120 for forwarding at a single instance to UE 102. The aggregation/proxy module 120 may be located in any convenient position along a communications path to intercept messages generated by mobile data applications that may be transmitted from a party, such as application server 108. In embodiments in which an operator runs a mobile WiMAX network, for example, the aggregation/proxy module 120 may reside in an access service network gateway (ASN-GW). In embodiments in which an operator runs a 3GPP-LTE network, the aggregation/proxy module 120 may be located, for example, in the serving gateway (S-GW), which routes and forwards user data packets, and may terminate a downlink data path. The aggregation/proxy module 120 may alternatively be located in the packet data network gateway (P-GW) of a 3GPP-LTE network, which provides connectivity of the UE to external packet data networks.

In some embodiments, the aggregation/proxy module 120 may store together different messages to be transmitted in a downlink to different respective UEs that may be served by a common operator controlling the core network 106.

Figure 3:
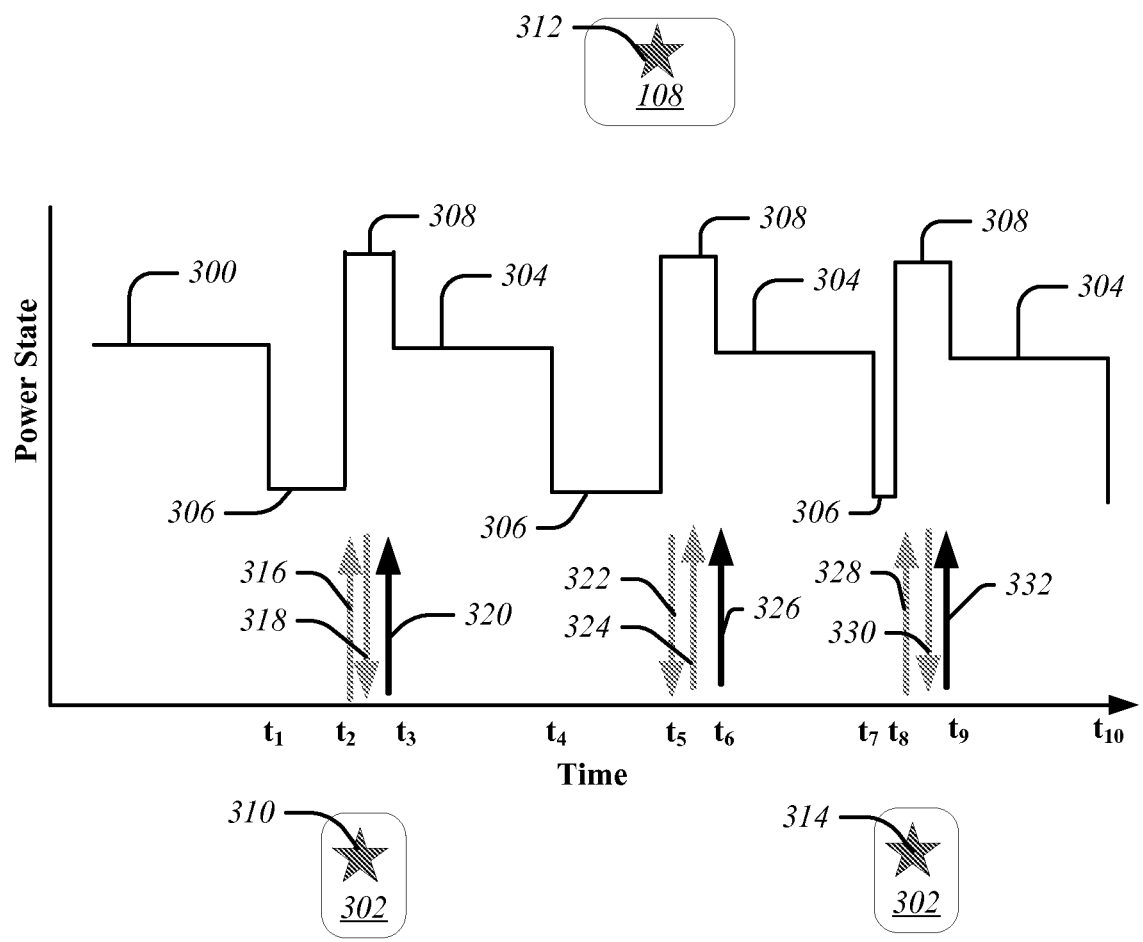
FIG. 3 depicts a conventional messaging scenario.
Figure 4:
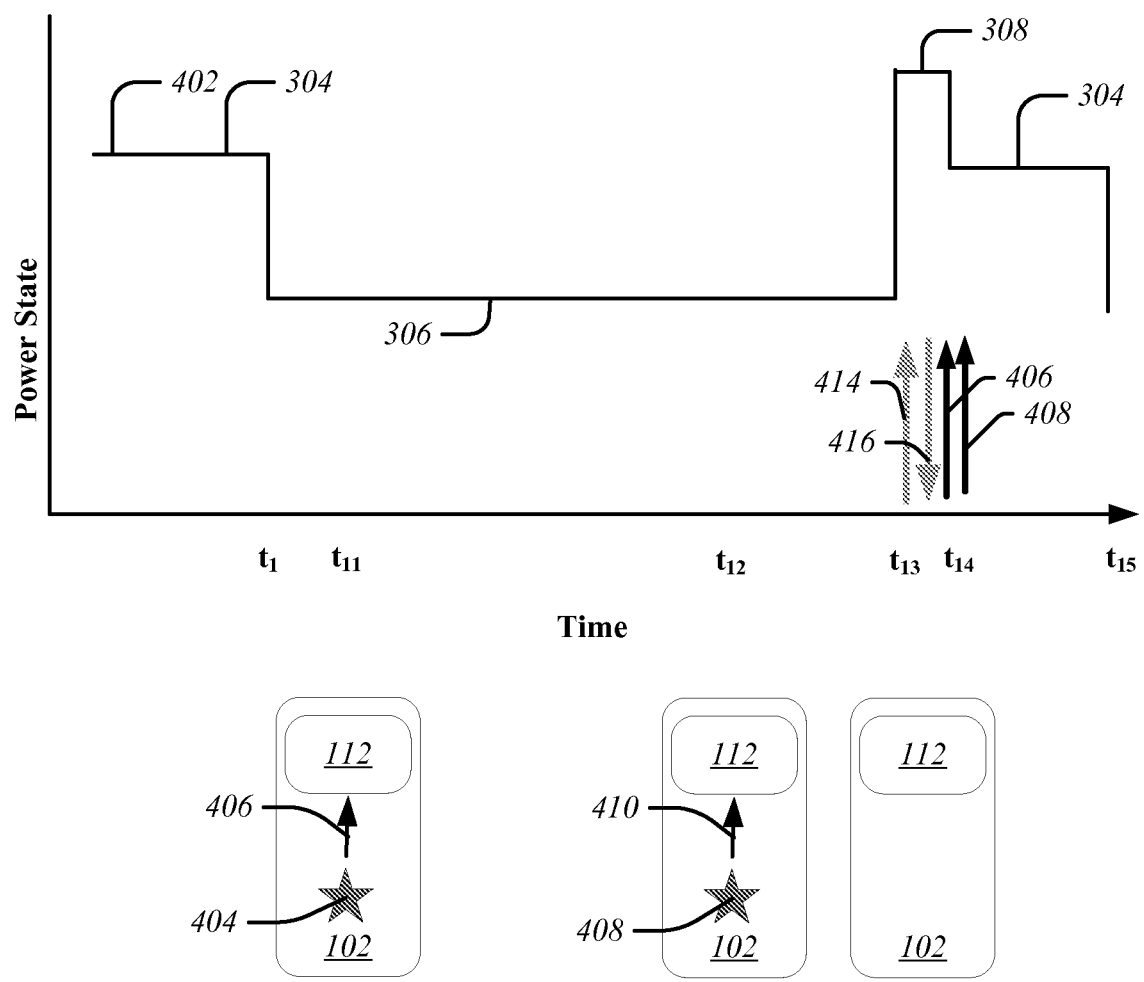
FIG. 4 depicts a messaging scenario consistent with the present embodiments.

In order to further illustrate operation of the present embodiments, FIG. 3 depicts a conventional scenario and FIG. 4 depicts a scenario consistent with the present embodiments, in which a UE transitions between different states (modes) in response to messages generated by mobile data applications. In FIG. 3 there is shown a variation in UE power as a function of time for a scenario in which a conventional UE 302 is in communication with an application server 108. The curve 300 is meant to generally illustrate power consumed by a UE.

As illustrated, initially, the UE may be in an active mode represented by power level 304. In the active mode, radio equipment of the UE (not shown) may be powered on and various applications may be running in the UE 302.

After certain intervals in which no over the air traffic is communicated between the UE 302 and its associated RAN (not shown), the UE 302 may automatically transition to an idle mode at time $t_1$. In the idle mode, the radio and related circuitry may be in a quiescent state resulting in lower power consumption represented by power level 308. As illustrated, the UE 302 may remain in the idle mode until a $t_2$. At the time $t_2$ a status update message 320 is generated by a first mobile data application 310 running on UE 302. The generation of a status update message 320 triggers a radio and related circuitry to power on, and an uplink control signal 316 is sent by the UE 302 to establish connection with its RAN, which is followed by receipt of a downlink control signal in response. The status update message 320 is then wirelessly transmitted by the UE 302. During the control signaling and sending of the status update message, the UE 302 may expend additional power, which is represented by the power level 308, until the time $t_3$. The power level of the UE 302 then reduces to the active power level 306 characteristic of active mode in which the radio is powered on but is not receiving or transmitting data. Because the UE 302 may be set to remain in active mode for a predetermined period of time after waking up, the UE 302 then remains in active mode until time $t_4$ even though no further communications take place.

At time $t_4$, the UE 302 transitions back to an idle mode represented by power level 306 until a subsequent time $t_5$. At time $t_5$ a second mobile data application 312 running in the application server 108 triggers the sending of a status update message. A control signal 322 is received by UE 302, which causes the UE 302 to wake up and return a control signal 324. The UE 302 may subsequently return a status update message 326. Once more, the power level consumed by UE 302 may be represented by power level 308 during this period of signaling and data transmission. The UE 302 then returns to an active mode at the time $t_6$, and remains at power level 304 for a predetermined duration until the time $t_7$. When the active mode "times out" at the time $t_7$ the UE 302 may turn off radio equipment once again and enter an idle mode represented by power level 308.

At the time $t_8$ a third mobile data application 314 running in UE 302 generates a status update message that triggers the UE 302 to exit idle mode. An uplink control signal 328 is sent and downlink control signal 330 is received, after which a status update message 332 is transmitted by UE 302, during which period of signaling and data transmission the power consumed by UE 302 may be represented by power level 308. Subsequently, at the time $t_9$ the UE 302 returns to active mode power level represented by power level 304 and may remain in active mode for a predetermined duration until time $t_{10}$, after which the UE 302 may transition to an idle state.

It is to be noted that the scenario generally depicted in FIG. 3 may extend in time, such that each mobile data application 310, 312, 314, periodically or occasionally generates messages, such as status update messages, that trigger a transition of the UE 302 from idle to active mode. It is evident from inspection of the curve 300 that such status update messages may cause the UE 302 to expend an excessive amount of time either in active mode (level 304) or transmitting signal (curve 308), both of which expend excessive power. In addition, the periodic or occasional generation of individual status update messages may cause excessive signaling overhead as depicted in FIG. 3.

To summarize the issues raised by the behavior illustrated by FIG. 3: when the UE constantly flips between active and idle state, there are multiple problems observed. In one example, increased control plane signaling occurs. In particular, there is excessive signaling overhead (both in a radio access network (RAN) and in the core network (CN)) that is required to just send these occasional, very small update messages. To send just one update message, it may take one round of idle-active transition, which may incur significant signaling overhead, including multiple radio resource control (RRC) messages in RAN (e.g. Service Request, Radio Bear Establishment/Release, and Paging when message is MT) and EPC signaling messages (e.g. Service Request, Connection Setup/Release). The RRC protocol and a RRC connection request is defined in other 3GPP specifications, such as 3GPP TS 25.331 titled "Technical Specification Group Radio Access Network; Radio Resource Control (RRC); Protocol Specification, Release 10," Dated Oct. 2, 2011, Section 8.1.3.3, for example. A second major issue is reduced battery life of the UE 302. In a worst case scenario, when multiple applications generate update messages soon after a UE 302 enters an idle state, the energy consumption of the UE 302 increases due to constant flipping between active and idle state, which may be higher than if the phone just remains in active mode.

Table 1 provides summary of the problem scenarios, the sources of problems, and the affected elements of the frequent idle-active state transition scenarios.

TABLE I

Signaling inefficiency and reduced battery life caused by mobile data application status updates and keep-alive messages

| Problem scenario | Apps that cause the problem | Effect to EPC | Effect to RAN | Effect to UE |
|---|---|---|---|---|
| MO status update | Social ntwk: UE owner's status update. Geo service app: geo-tags, geo-cast etc. | signaling overhead (set-up & tear-down) | RRC signaling overhead | Reduced battery life |
| MO periodic keep-alive | VPN Skype when not in a call | | | |
| MT status update | Social ntwk: friends' content/status update. Geo service app: location-targeted event/ads. | signaling overhead (set-up & tear-down) | RRC signaling overhead paging signaling overhead to tracking area | Reduced battery life |
| MT periodic keep-alive | Skype when not in a call | | | |

In the embodiments whose operation is depicted in FIG. 4, these problems are addressed by providing modules in a UE 102 and/or in a network to manage the transmission of status update messages. FIG. 4 depicts a scenario in which multiple status update messages are generated from the UE end, which may be generated by two different mobile data applications in some embodiments. As illustrated by the curve 402, the UE 102 may initially be in an active power mode characterized by power level 304. In some embodiments the active mode may correspond to an ECM-Connected state as defined in 3GPP TS 23.401 section 4.6.3.2. In the 3GPP standard, an evolved packet system (EPS) is defined that provides IP connectivity through a radio access network (RAN). Two EPS-connection management (ECM) states are defined: ECM-Idle and ECM-Connected. In the ECM-Idle mode no non-access stratum signaling exists between a UE and a mobility management entity (MME) of a core network connected to the RAN. In the ECM-Connected state, signaling exists between a mobile terminal (UE) and MME including signaling over the S1 interface, which may be used to transmit the first message.

At a time $t_1$ the UE may automatically transition to an idle mode represented by power level 306. In some embodiments the active mode may correspond to an ECM-Idle mode as defined in 3GPP TS 23.401 section 4.6.3.1 and discussed above. As noted above, this may take place according to a predetermined duration set for the UE to remain in an active mode without receiving or sending any traffic. In one example, the predetermined duration may be determined by a timer in a base station (not shown) of the RAN 104, which may send an RRC Connection Release message to the UE after a period of inactivity corresponding to the predetermined duration, which message causes the UE S1 connection to the MME to be released and the UE to transition to the ECM-Idle mode.

At time $t_{11}$ a mobile data application 404 generates a status update message 406. The status update message 406 is forwarded to the middleware module 112. Instead of forwarding the status update message 406 for transmission, the middleware module may store the status update message 406. Consistent with various embodiments, the middleware module 112 may be arranged to permit transmission of status update messages only according to a predetermined procedure. For example, the middleware module 112 may be set to schedule transmission of any received status update messages only at fixed intervals. Any messages received between the first time of transmission of status update messages and a next scheduled time of transmission may be stored without transmission. Accordingly, referring also to FIG. 1, at time $t_{11}$ no status update message is sent to a transceiver 116 for transmitting. The UE 102 is therefore not required to exit an idle mode and the power consumption for UE 102 remains at the power level 306.

Subsequently, at a time $t_{12}$ a status update application 408 also running in UE 102 may generate a second status update message 410, which is intercepted by middleware 112. At the instance in time represented by $t_{12}$ the middleware 112 may determine that the second status update message 410 is to be held until a subsequent time corresponding to a next scheduled instance for transmitting status update messages. Accordingly, the UE 102 may remain in idle mode and the power consumption for UE 102 remains at the power level 306.

At a subsequent instance represented by $t_{13}$ the middleware module 112 may determine that the time for transmitting any queued (stored) status update messages has arrived. The UE 102 may therefore transition out of the idle mode and send an uplink control signal 414 to initiate communications, which is followed by receipt of a downlink control signal 416. Subsequently, the status update messages 406 and 408 may be transmitted by UE 102. In some embodiments, the status update messages may be sent in the same batch of messages, for example, within a same uplink communication frame or within a same uplink communication sub-frame. During this time, the UE 102 may consume power represented by power level 308, as illustrated. At time $t_{14}$ the UE 102 may reduce power consumption to an active power mode characterized by power level 306. Subsequently, at time $t_{15}$ the UE 102 may transition back to an idle mode.

Figure 5:
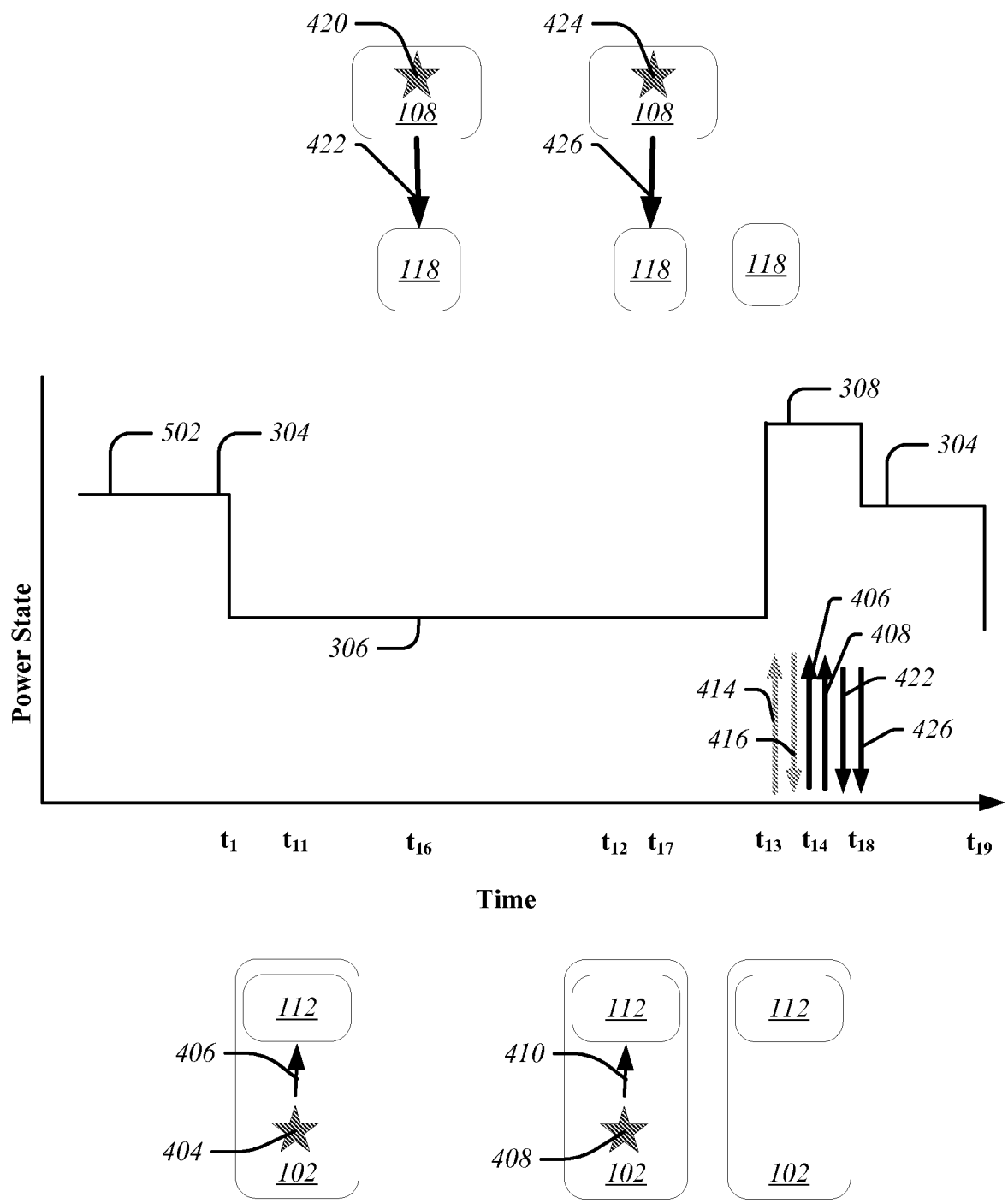
FIG. 5 depicts another scenario messaging scenario consistent with the present embodiments.

FIG. 5 depicts a scenario similar to that of FIG. 4, in which multiple status update messages are generated from the UE end, which may be generated by two different mobile data applications in some embodiments. In addition, in the scenario depicted in FIG. 5, a mobile data application 420 resident in application server 108 generates a status update message 422 at a time $t_{16}$ which may lie between times $t_1$ and $t_{14}$. The application server 108 may be linked to UE 102 to facilitate operation of one or more mobile data applications including the application 420. Consistent with the present embodiments, the aggregation/proxy module 120 may intercept the status update message 422 and prevent the status update message 422 from being delivered until a later instance in time. In this manner, UE 102 does not receive any communication at time $t_{16}$ and continues in an idle mode characterized by power level 306. In some embodiments, the later instance in time for sending of status update message 422 may be solely determined by the aggregation/proxy module 120, which may be located in an operator network servicing UE 102, as noted above. However, in other embodiments, the sending of the status update message 422 may be coordinated with the UE 102.

As further illustrated in FIG. 5, another mobile data application 424 resident in application server 108 may generate a status update message 426 at a time $t_{17}$ which may also lie between times $t_1$ and $t_{14}$. The aggregation/proxy module 120 may also intercept the status update message 426 and prevent the status update message 426 from being delivered until a later instance in time. In this manner, UE 102, which does not receive any communication at time $t_{11}$, remains in an idle mode characterized by power level 306.

In the embodiment explicitly depicted in FIG. 5, at time $t_{13}$ the middleware module 112 may determine that the time for transmitting any queued (stored) status update messages has arrived. The UE 102 may therefore transition out of the idle mode and send the status update messages 406 and 408 as in the scenario of FIG. 4. In addition, the aggregation/proxy module 120 may deliver the status update messages 422 and 426 at the same period of time, as illustrated may be transmitted by UE 102. During this time, the UE 102 may consume power represented by power level 306, as illustrated. At time $t_{18}$ the UE 102 may reduce power consumption to an active power mode characterized by power level 304. Subsequently, at time $t_{19}$ the UE 102 may transition back to an idle mode.

Figure 6:
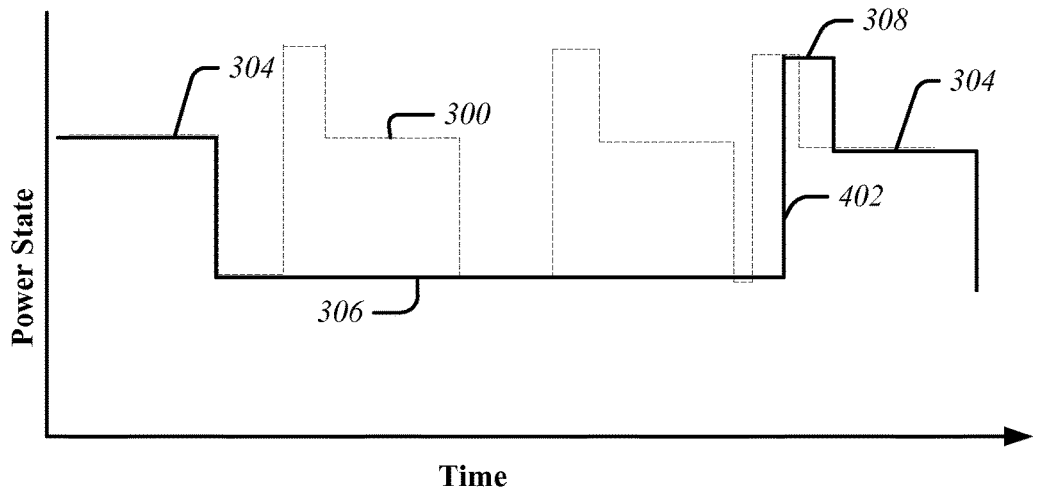
FIG. 6 presents a comparison of a first curve for conventional operation of a UE to a second curve for operation of a UE consistent with the present embodiments.

In both the scenarios depicted in FIGS. 4, 5, the number of instances in which a UE 102 is required to transmit and receive control signals is reduced as compared to the conventional operation of a UE 302 shown in FIG. 3. Additionally, the total duration in the active mode (power level 304) or signaling mode (power level 306) is reduced in the scenarios of FIGS. 4, 5. To further highlight the advantages provided by the present embodiments, FIG. 6 presents a comparison of the curve 300 for conventional operation of a UE to provide status update messages and the curve 402 for operation of a UE consistent with the present embodiments. As is evident, under conventional operation, the UE may spend a majority of time operating in active mode or signaling mode, while the present embodiments may reduce the total active and signaling mode time such that a greater fraction, even a majority of the time (when the UE is not otherwise engaged) is spent in idle mode.

In various other embodiments, a UE and/or aggregation/proxy module in a network may serve to aggregate keep-alive messages similarly to the operation depicted in FIGS. 4-6 for status update messages. Turning again to FIG. 1, the middleware module 112 may operate to aggregate keep-alive messages generated by a mobile data application. It is to be further noted that the delay tolerance may vary among different applications. Accordingly, consistent with further embodiments, a UE and/or network aggregation/proxy module may be operable to set different periods for aggregation of messages generated by an application, in accordance with the specific application or application type used to generate the message. For example, a given VOIP application may exhibit less (or more) delay tolerance than a mobile data application that generates a status update message.

Figure 7:
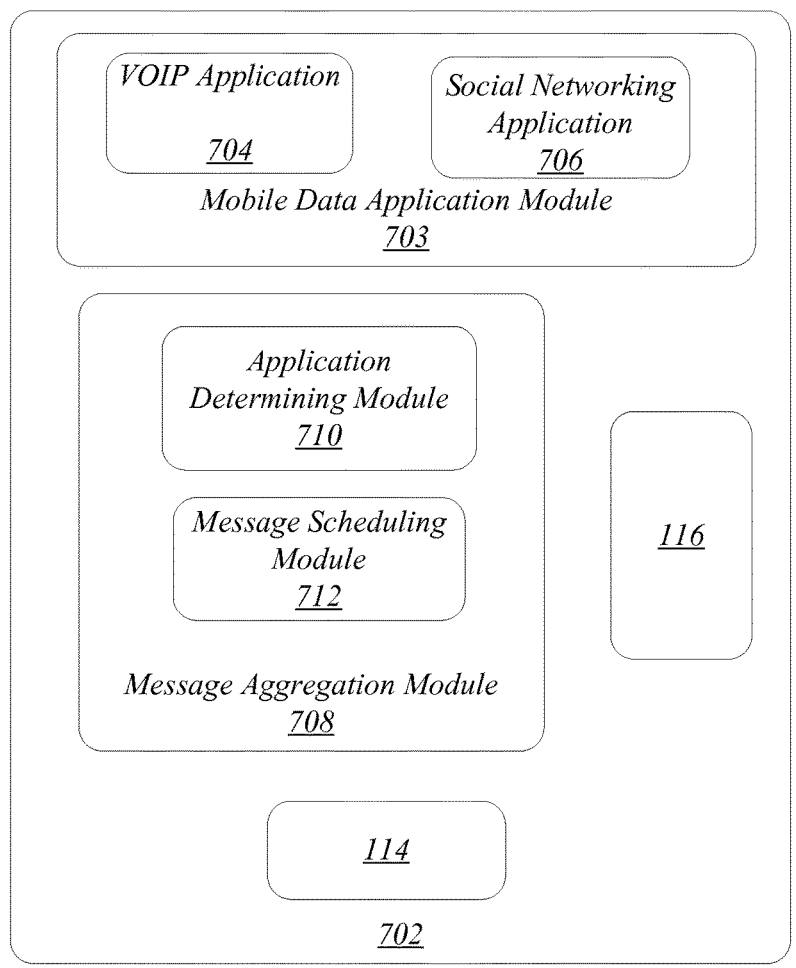
FIG. 7 depicts a UE arranged according to additional embodiments.

FIG. 7 depicts a UE 702 arranged according to additional embodiments. The UE 702 may include multiple applications including mobile data applications. As illustrated, the UE 702 contains a mobile data application module 703 that includes a VOIP application 704 and social networking application 706, which are two exemplary mobile data applications among many that may be implemented by the mobile data application module 703. Each of these applications, when running on UE 702, may generate occasional or periodic messages to be transmitted via transceiver 116 to a receiving entity, such as a server or other device that hosts or otherwise interacts with the UE 702 to facilitate the application. The UE 702 also includes a middleware component, referred to herein as a message aggregation module 708, which acts to aggregate messages to be transmitted by transceiver 116. The message aggregation module 708, which may be embedded in an operating system of UE 702 in some embodiments, includes an application determining module 710 and message scheduling module 712. The application determining module 710 may be operable to receive messages generated by mobile data applications 703, including the VOIP application 704 and social networking application 706, and may ascertain the type or exact application that generates a given message.

Such mobile data applications may include social networking applications such as Facebook, Linkedin®, etc.; instant messaging applications; social networking service applications; various email applications; voice-over-IP applications including Skype; geoservices applications including targeted advertising; news and weather applications; and other applications that may generate messages either from the mobile terminal or from a network, or both.

In one example, a signature of each application may be known to an operating system that controls message aggregation module 708, when each application is installed in the UE 702. Accordingly, the application determining module 710 may simply check an incoming message for the signature indicating the application that generated the message. The application determining module 710 may forward this information to the message scheduling module 712, which may schedule a given message for transmission by transceiver 116 according to the time that the message is received by message aggregation module 708, as well as the information concerning the type of message provided by application determining module 710.

In operation, the message scheduling module 712, which may include a buffer or buffers for storing messages. For example, a first message may be placed in a first buffer when the first message constitutes a first background traffic message that includes either a status update or keep-alive message. The application determining module 710 may ascertain that a second mobile data application has generated a second message, such that the message scheduling module 712 places the second message in a second buffer when the second message constitutes a second background traffic message different from the first background traffic message.

The message scheduling module 712 may be operable to schedule for transmission at a first instance messages stored in the first buffer; and schedule for transmission at a second instance different from the first instance messages stored in the second buffer.

Moreover, the message determining module may determine a message type, such as a status update message type for each of multiple status update messages, and the message scheduling module 712 may schedule for transmission each status update message according to an interval for the determined status message type.

Thus, the message scheduling module 712 may aggregate in the first buffer messages of a first type using a first aggregation period and may aggregate in the second buffer messages of a second type using a second aggregation period. Each aggregation period may be arranged so that any given message is scheduled for transmission and is transmitted after being received from the application within a time corresponding to the delay tolerance of that application. For example, a VOIP application resident on UE 702 may generate a keep-alive message every 30 seconds, which messages are intercepted by message aggregation module 702 before being sent for wireless transmission to a remote party, such as an application server. The message aggregation module 708 may set an aggregation period for such VOIP keep-alive messages to be two minutes, which is deemed within a delay tolerance for that VOIP application. Thus, each VOIP message received and aggregated by the message aggregation module 708 is forwarded for transmission by message scheduling module 712 within no more than two minutes of receipt of the message by message aggregation module 706. On the other hand, a social networking application may generate a status update message every one minute, which is also intercepted and stored by message aggregation module 708. The message aggregation module 708 may set an aggregation period for such status update messages to be every eight minutes, which is deemed within a delay tolerance for that social networking application. Thus, each status update message received and aggregated by the message aggregation module 708 is forwarded for transmission by message scheduling module 712 within no more than eight minutes of receipt of the message by message aggregation module 706.

In various embodiments, the message aggregation functions described hereinabove, in particular with respect to FIGS. 4-7, may be employed when a UE is in an active or in an idle mode. Thus, for example, if the UE is in an ECM-connected state, the message aggregation module 708 may act to aggregate status update and/or keep-alive messages for a predetermined period of time, which may exceed the expiration time set by a network timer for S1 release of the UE due to inactivity, as set forth in TS 23.401 § 5.3.5. Once the messages are aggregated such that the timer has expired for 51 release, the network to which the UE is connected may initiate the release of the S1 connection, after which the UE may transition to the ECM-idle state where power consumption is reduced. Otherwise, if the message aggregation did not take place during an ECM-connected state of the UE, the generation of keep-alive messages and/or status update messages may prevent or severely limit any transition to an ECM-idle mode. For example, if the interval between generated keep-alive and/or status update messages were less than the timer period for S1 release, the base station or other entity of the network receiving the keep-alive and/or status update messages may detect activity before expiration of a timer, resulting in the timer continually being reset before expiration, such that a transition to ECM-Idle state is never initiated.

Thus, the present embodiments facilitate not only maintaining a UE in an ECM-idle state for extended periods by aggregating mobile data application messages generated during an ECM-idle state, but also expedite transitioning the UE to the ECM-Idle state.

In various additional embodiments, the message aggregation module 708 may provide information for transmission in a control message to a network related to the background messages to be transmitted by the UE 702. Such information may include configuration and/or priorities of different type of status update messages to be transmitted from the UE. This may help a network entity, such as aggregation/proxy module 120 in making decisions regarding consolidation (aggregation) of messages to be transmitted to the UE 102 in a downlink communication.

Turning once more to FIG. 2, in various additional embodiments, as previously noted, a network operator that supports communications with UE may contain a aggregation/proxy module 120 that is operable to aggregate messages generated by a third party, such as the application server 108. It is to be noted that messages received by proxy module 120 may include status update messages 208 and keep-alive messages 210.

In various embodiments, an aggregation module, such as aggregation/proxy module 120, may apply one or more type of filtering procedures to intercept messages, such as status update messages or keep-alive messages. Because the aggregation/proxy module may have no prior knowledge of the type of data traffic being received, such an aggregation/proxy module may have to apply one or more inspection procedures in order to ascertain whether a given message is to be held for aggregation, and, more particularly, what type of message is being received.

Figure 8:
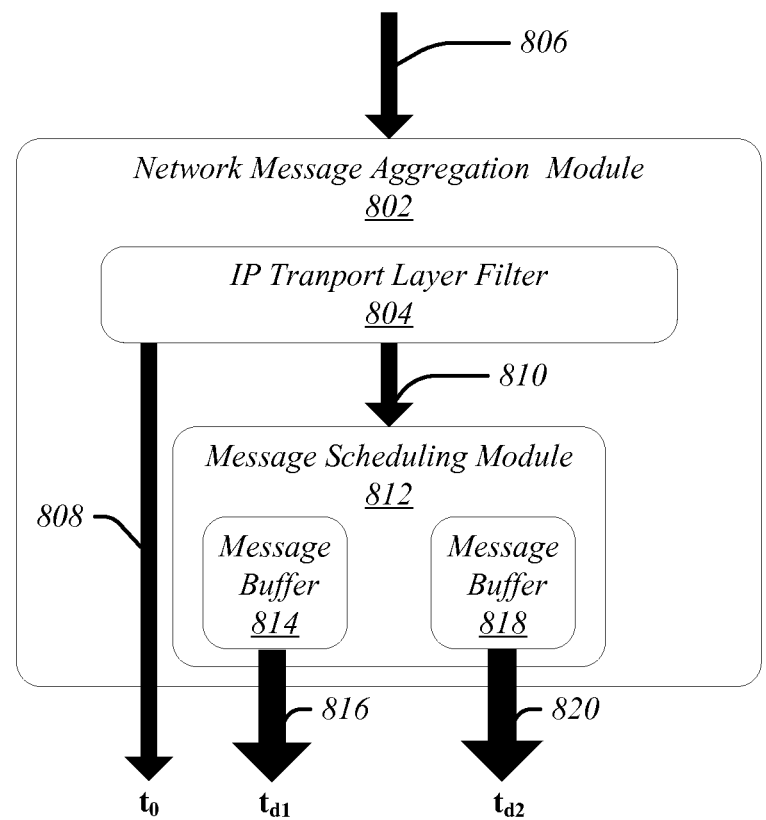
FIG. 8 depicts details of a network message aggregation module consistent with further embodiments.

FIG. 8 depicts details of a network aggregation module 802 consistent with further embodiments. In various embodiments, the network aggregation module 802 may include an IP transport layer filter 804 that filters incoming messages 806 meant for a user, such as the UE 102. In some embodiments, the IP transport layer filter 804 may receive messages 806 as packet switched data and filter out mobile data applications' update messages or keep-alive messages among regular packet-switch data traffic. This may be accomplished by determining an IP/transport layer signature, including type of service (TOS), field, or port number, for example. If the IP transport layer filter 804 determines that the message 806 is a regular packet switched data, the message may be forwarded as message 808 at a time to, that is, the forwarding may take place without further delay to the intended recipient, such as UE 102. For example, the message 808 may represent data of a mobile application, such as voice, video, or other data. If the incoming message 806 is determined to constitute a status update message or keep-alive message, or similar message to be aggregated, the incoming message 806 may be forwarded to message scheduling module 812 for later transmission to the recipient. Each status update or keep-alive message received and aggregated by the message scheduling module 812 may be transmitted according to the type of message as discussed above with respect to FIG. 7. Thus, a first category of messages may be aggregated into a first message buffer 814 and forwarded as a first message output 816 at a subsequent time tai, while a second category of messages may be aggregated into a second message buffer 818 and forwarded as a second message output 820 at a subsequent time $t_{d2}$.

Figure 9:
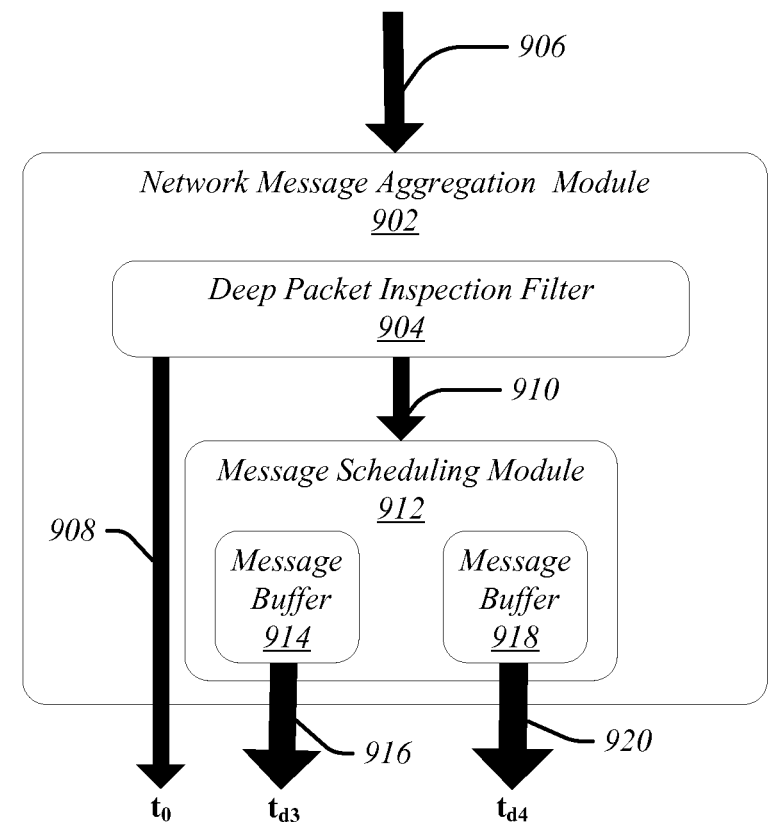
FIG. 9 depicts details of another network message aggregation module consistent with further embodiments.

FIG. 9 depicts details of another network aggregation module 902 consistent with further embodiments. In various embodiments, the network aggregation module 902 may include a deep packet inspection filter 904 that also filters incoming messages 906 meant for a user, such as the UE 102. In some embodiments, deep packet inspection filter 904 may receive messages 906 as packet switched data and filter out mobile data applications' update messages of keep-alive messages among regular packet-switch data traffic. This may be accomplished by determining the content of messages using deep packet inspection to look for signatures of mobile data applications within the content of the data packet.

If the deep packet inspection filter 904 determines that the message 906 is a regular packet switched data, the message may be forwarded as message 908 at a time to, that is, the forwarding may take place without further delay to the intended recipient, such as UE 102. For example, the message 908 may represent data of a mobile application, such as voice, video, or other data. If the incoming message 806 is determined to constitute a status update message or keep-alive message, or similar message to be aggregated, the incoming message 906 may be forwarded to message scheduling module 912 for later transmission to the recipient. Each status update or keep-alive message received and aggregated by the message scheduling module 912 may be transmitted according to the type of message as discussed above with respect to FIG. 7. Thus, a first category of messages may be aggregated into a first message buffer 914 and forwarded as a first message output 916 at a subsequent time $t_{d3}$, while a second category of messages may be aggregated into a second message buffer 918 and forwarded as a second message output 920 at a subsequent time $t_{d4}$.

Figure 10:
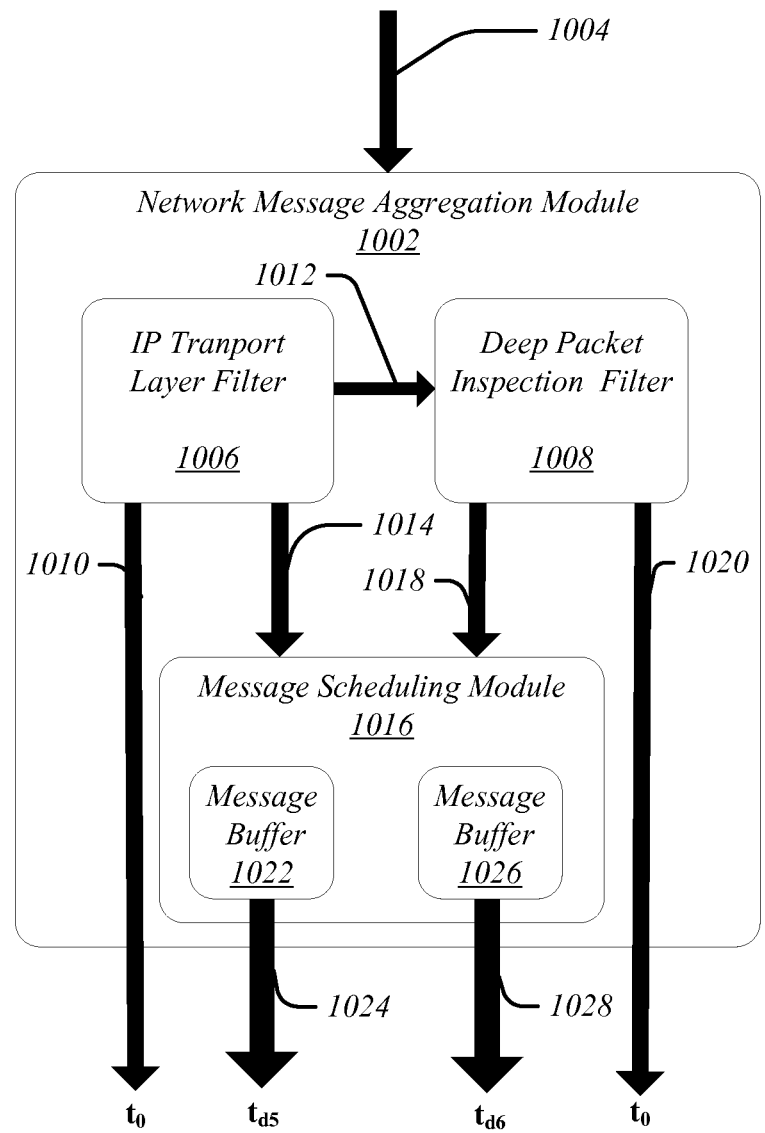
FIG. 10 depicts details of a further network message aggregation module consistent with other embodiments.

FIG. 10 depicts details of a further network aggregation module 1002 consistent with other embodiments. As illustrated, the network aggregation module 1002 may receive incoming messages 1004 and forward them for processing by an IP transport layer filter 1006 filter and a deep packet inspection filter 1008. In one embodiment, the IP transport layer filter may initially inspect the incoming message 1004 and forward the message as message 1010 if it is determined that the incoming message 1004 is not to be aggregated by examination of the IP/transport layer signature of the incoming message 1004. If the nature of the incoming message is undetermined by the IP transport layer filter 1006, the message may be forwarded as message 1012 to deep packet inspection filter 1008 for examination. If the message is determined by IP transport layer filter to be a status update message, keep-alive message or other message to be aggregated by network message aggregation module 1002, the message may be forwarded as message 1014 to message scheduling module 1016. The deep packet inspection module 1008 may receive message 1012 and determine using deep packet inspection whether it is an update message or keep-alive message, or other message to be aggregated. If so, the message may be forwarded as a message 1018 to message scheduling module. If the message is not to be aggregated, a message 1020 may be transmitted at the time to. Any messages to be aggregated may be subsequently transmitted according to the type of message as discussed above with respect to FIG. 7. Thus, a first category of messages may be aggregated into a first message buffer 1022 and forwarded as a first message output 1024 at a subsequent time $t_{d5}$, while a second category of messages may be aggregated into a second message buffer 1026 and forwarded as a second message output 1028 at a subsequent time $t_{d6}$.

Turning once more to FIG. 2, in embodiments in which a core network an aggregation/proxy module 120, such a module may function as a proxy for messages, such as keep-alive messages, that are generated by a mobile data application 110. Since keep-alive messages may be generated periodically to maintain an application, such as a VOIP communication, the middleware module 112 may generate a signal to maintain the VOIP communication.

Figure 11:
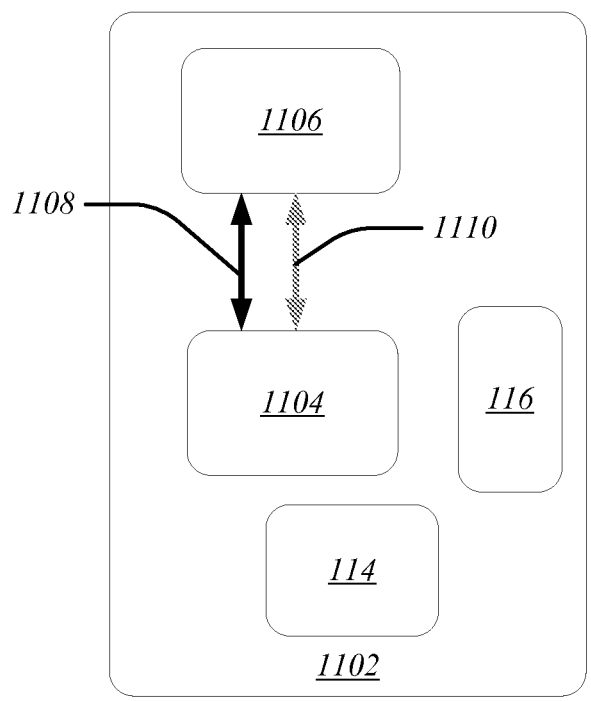
FIG. 11 depicts one embodiment of a middleware module in which the middleware module is a keep-alive proxy.

FIG. 11 depicts one embodiment of a middleware module in which the middleware module is a keep-alive proxy. The UE 1102 includes the proxy 1104, which is coupled to VOIP application 1106. The proxy VOIP application 1106 may periodically generate a keep-alive signal 1108 when a VOIP communication is active, which signal is intercepted by proxy (or proxy module) 1104. Instead of transmitting the message to an external party, the proxy 1104 may send a return message 1110 to VOIP application 1106, which serves in lieu of a message from an external server to maintain the VOIP communication.

Figure 12:
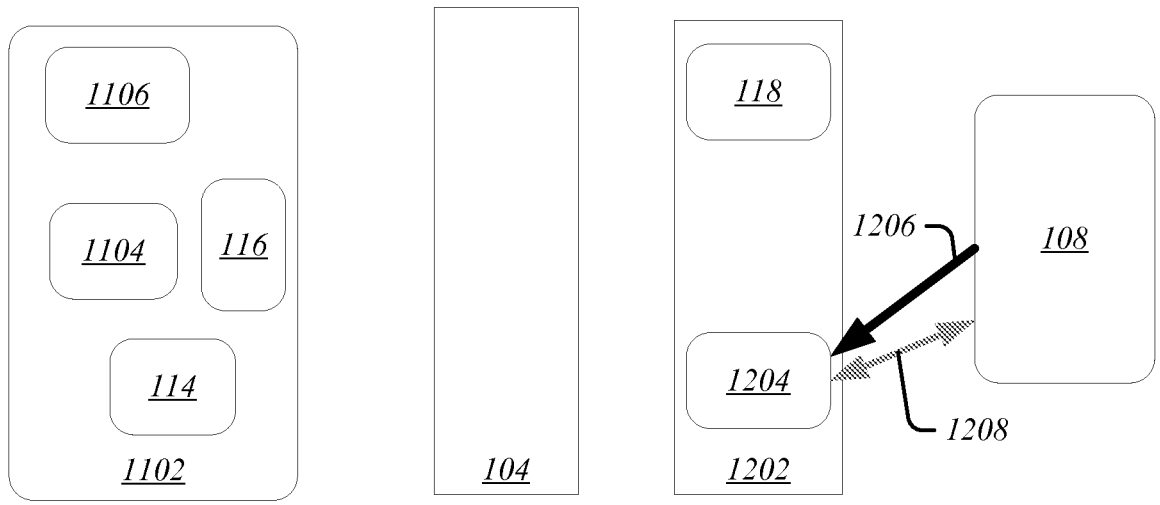
FIG. 12 depicts an embodiment of a network in which the network server includes a proxy module.

FIG. 12 depicts an embodiment of a network in which the network server 1202 includes a proxy module 1204. During an active VOIP communication session, the proxy module 1204 may intercept a keep-alive message 1206 output from the application server 108, and, instead of transmitting to UE 102, the proxy module 1204 returns a message 1208 to the network server, which serves to maintain the VOIP communication session. Thus, in accordance with the embodiments of FIGS. 11 and 12, a VOIP communication session may be kept active without requiring a transmitter 116 of the UE 1102 to wake-up, that is, without inducing a transition from idle to active mode.

Included herein is a set of flow charts representative of exemplary methodologies for performing novel aspects of the disclosed system and architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 13:
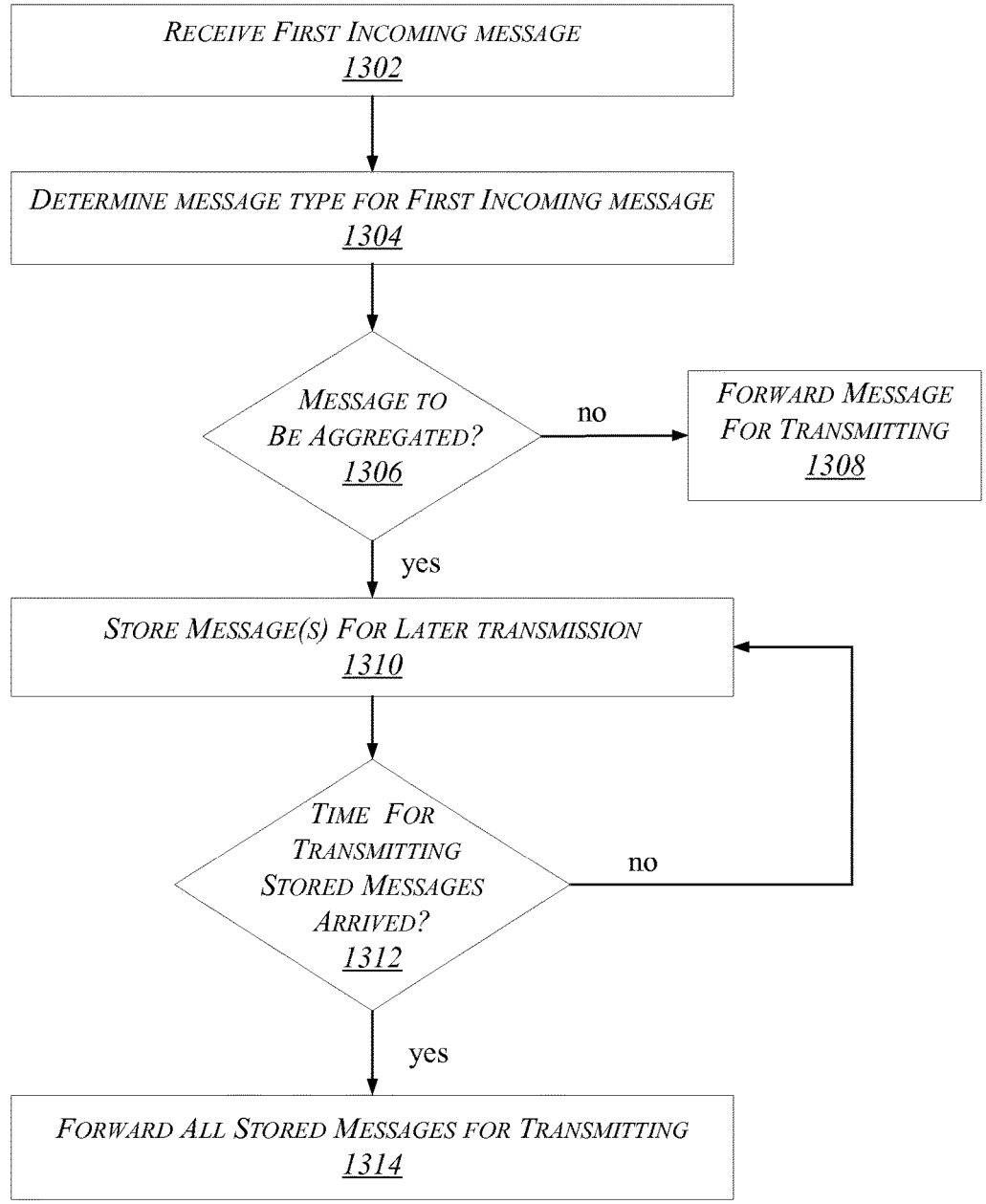
FIG. 13 depicts an exemplary logic flow.

FIG. 13 depicts an exemplary logic flow 1300. At block 1302 a first incoming message is received. At block 1304, the type of message represented by the first message is determined. At block 1306 a determination is made as to whether the first incoming message is to be aggregated is made. This determination may be based on factors such as the type of message for the first incoming message, the current mode of operation of a UE, such as idle mode or active mode, and other factors. If the message is not to be aggregated with other messages for later transmission, the flow moves to block 1308, where the first incoming message is forwarded for transmission.

If, at block 1306, the first incoming message is to be aggregated, the flow moves to block 1310, where the first incoming message is stored for later transmission. At block 1312, a determination is made as to whether the time for transmitting stored messages has arrived. If not, the flow returns to block 1310. If so, the flow moves to block 1314, where all stored messages are forwarded for transmission.

Figure 14:
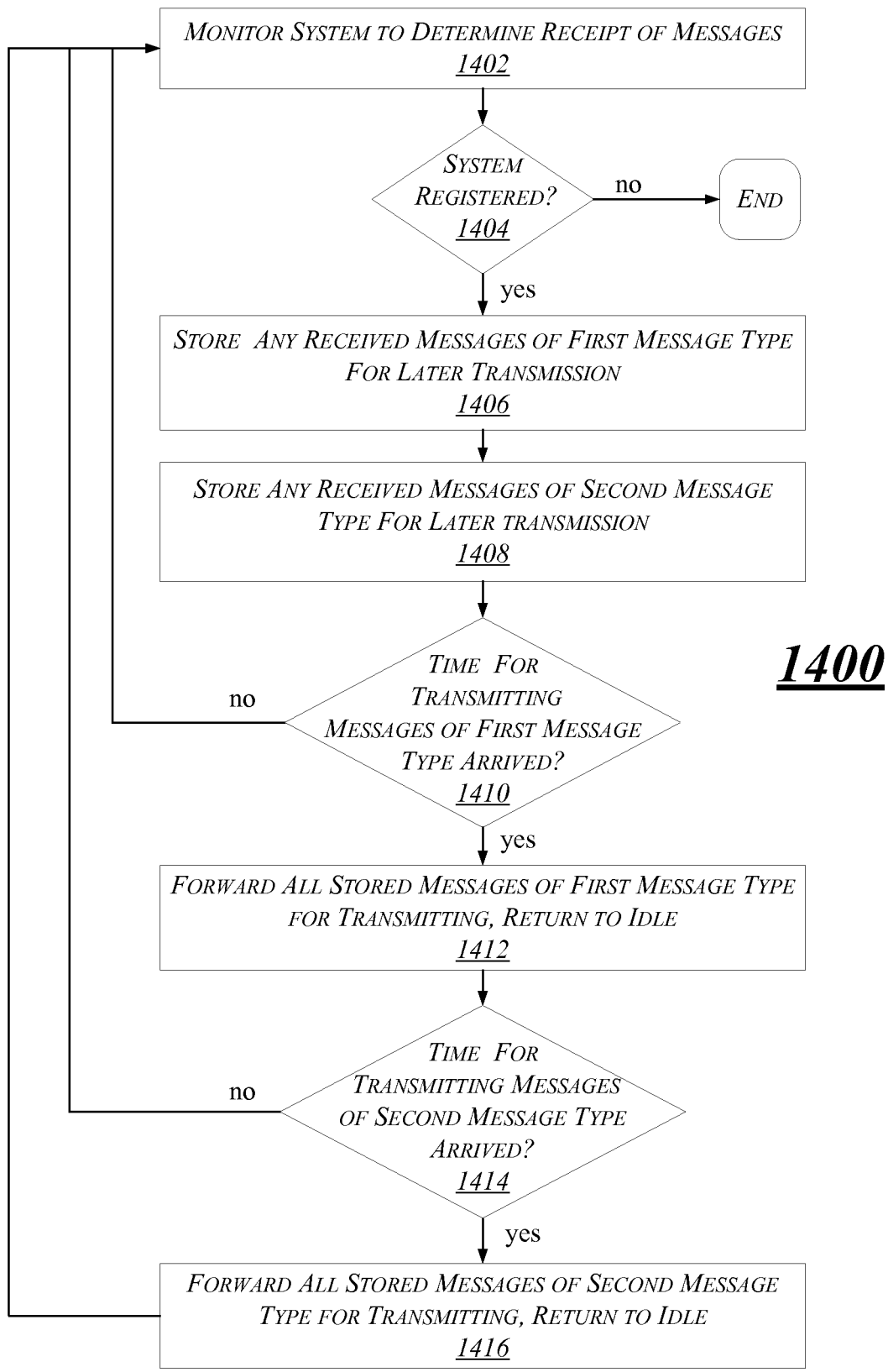
FIG. 14 depicts another exemplary logic flow.

FIG. 14 depicts another exemplary logic flow 1400. At block 1402, a system is monitored for receipt of messages. The messages may be generated, for example, by software in an automatic or occasional fashion. At block 1404, if the system is not registered to a network, the flow ends. If the system is registered, the flow moves to block 1406, where any received messages of a first message type are stored. At block 1408, any received messages of a second message type are also stored.

At block 1410 a determination is made as to whether the time for transmitting messages of the first type has arrived. If not, the flow returns to block 1402. If so, the flow moves to block 1412 where all stored messages of the first message type are forwarded for transmission.

At block 1414 a determination is made as to whether the time for transmitting messages of the second type has arrived. If not, the flow returns to block 1402. If so, the flow moves to block 1416 where all stored messages of the second message type are forwarded for transmission. The flow may return to block 1402 and cycle through blocks 1402 to 1416 multiple times until the system is not longer registered.

Figure 15:
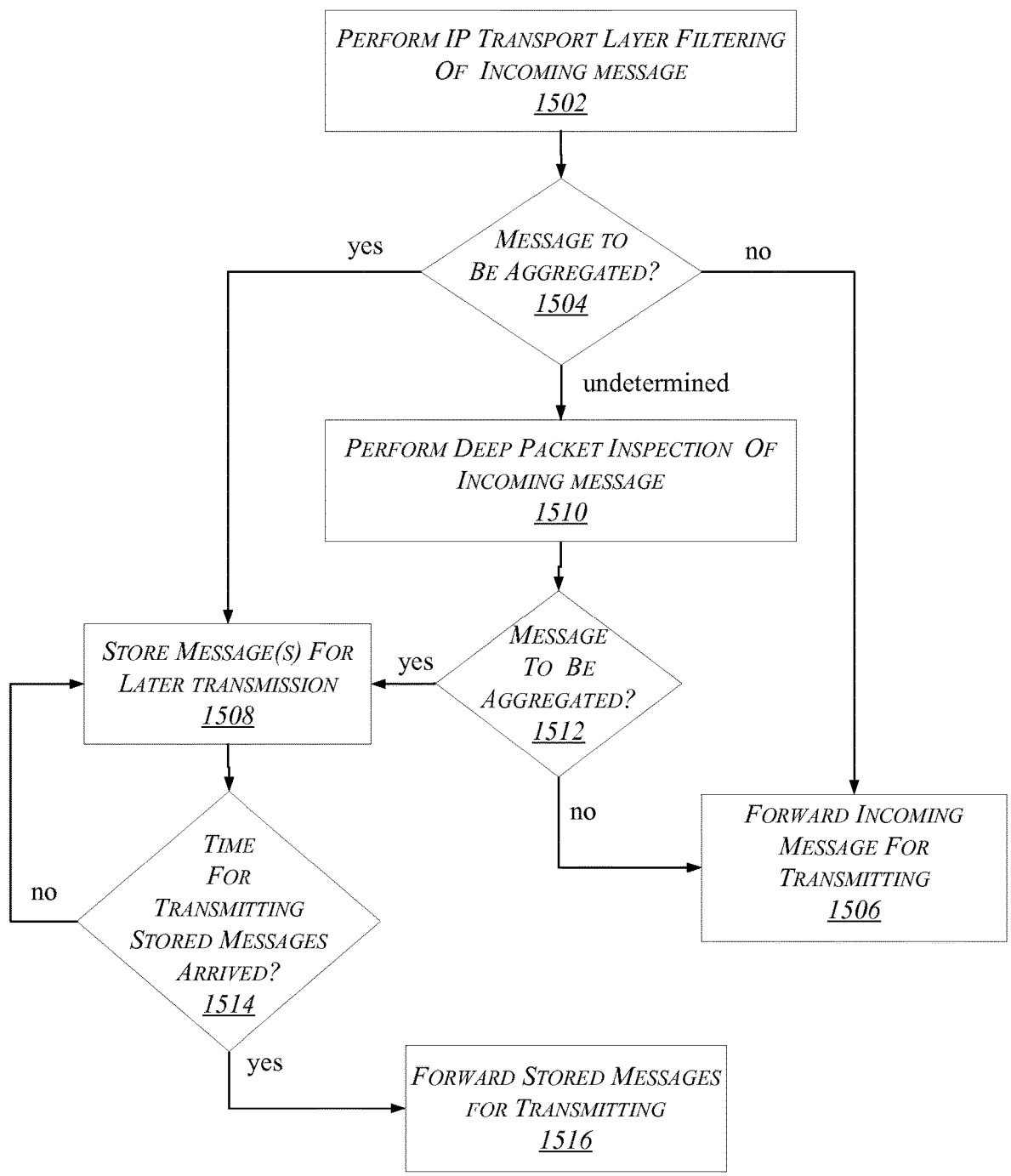
FIG. 15 depicts a further exemplary process flow.

FIG. 15 depicts a further exemplary process flow 1500. At block 1502, an IP transport filter is applied to an incoming message to determine the nature of the incoming message. At block 1504 a determination is made as to whether the incoming message is to be aggregated. If not, the flow moves to block 1506 where the incoming message is forwarded for transmitting. If so, the flow moves to block 1508 where the incoming message is stored for later transmission. If the IP transport layer filter does not determine whether the message is to be aggregated, for example, if the nature of the incoming message remains undetermined, the flow moves to block 1510.

At block 1510, deep packet inspection of the incoming block is performed. At block 1512, a determination is made as to whether the incoming message is to be aggregated based upon the deep packet inspection of block 1510. If not, the flow moves to block 1506 where the incoming message is forwarded for transmitting. If so, the flow moves to block 1508 where the incoming message is stored for later transmission.

The flow then moves to block 1514. At block 1514, if a time for transmitting stored messages has arrived, the flow moves to block 1516 where stored messages are forwarded for transmitting. If not, the flow returns to block 1508.

Figure 16:
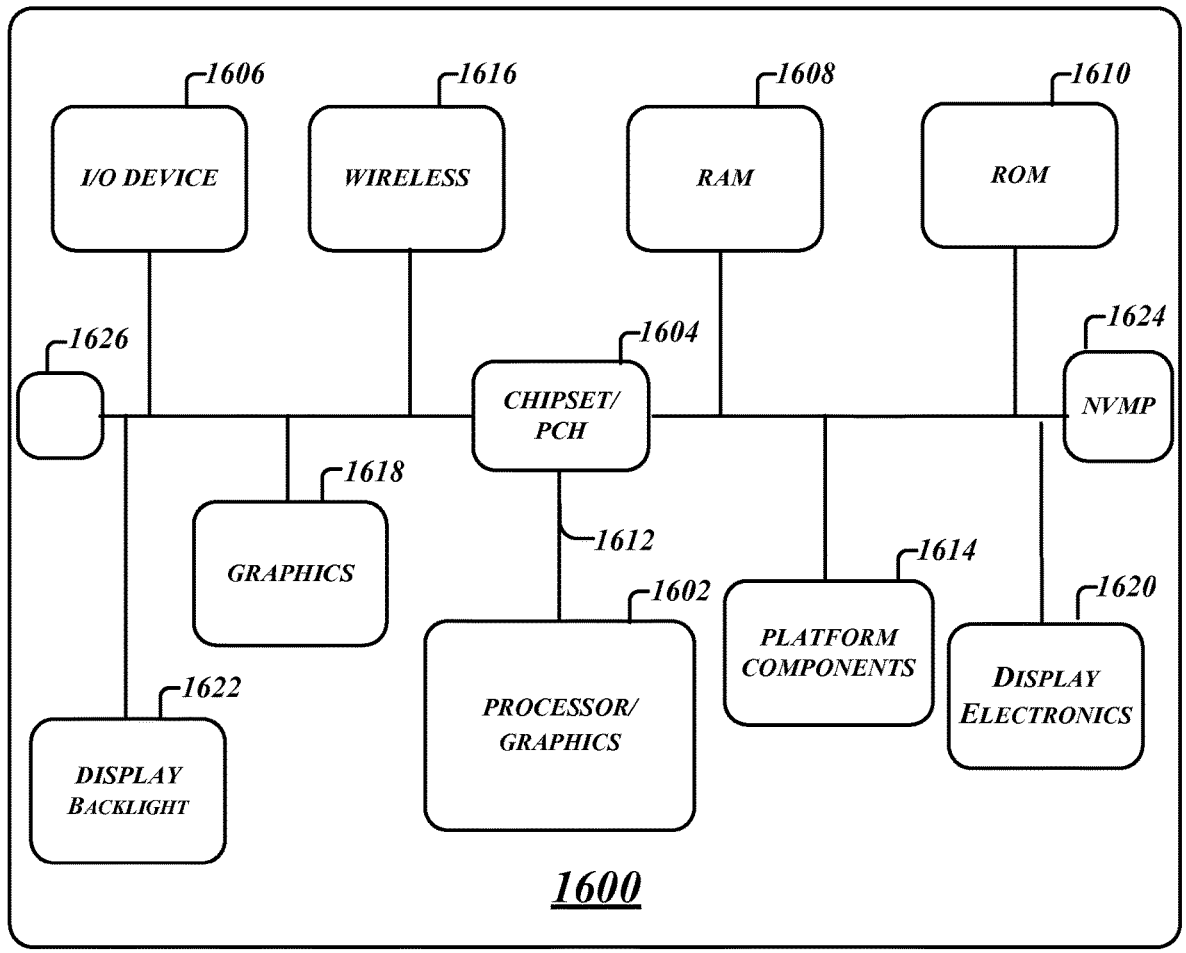
FIG. 16 is a diagram of an exemplary system embodiment.

FIG. 16 is a diagram of an exemplary system embodiment and in particular, FIG. 16 is a diagram showing a platform 1600, which may include various elements. For instance, FIG. 16 shows that platform (system) 1610 may include a processor/graphics core 1602, a chipset/platform control hub (PCH) 1604, an input/output (I/O) device 1606, a random access memory (RAM) (such as dynamic RAM (DRAM)) 1608, and a read only memory (ROM) 1610, display electronics 1620, display backlight 1622, and various other platform components 1614 (e.g., a fan, a crossflow blower, a heat sink, DTM system, cooling system, housing, vents, and so forth). System 1600 may also include wireless communications chip 1616 and graphics device 1618. The embodiments, however, are not limited to these elements.

As shown in FIG. 16, I/O device 1606, RAM 1608, and ROM 1610 are coupled to processor 1602 by way of chipset 1604. Chipset 1604 may be coupled to processor 1602 by a bus 1612. Accordingly, bus 1612 may include multiple lines.

Processor 1602 may be a central processing unit comprising one or more processor cores and may include any number of processors having any number of processor cores. The processor 1602 may include any type of processing unit, such as, for example, CPU, multi-processing unit, a reduced instruction set computer (RISC), a processor that have a pipeline, a complex instruction set computer (CISC), digital signal processor (DSP), and so forth. In some embodiments, processor 1602 may be multiple separate processors located on separate integrated circuit chips. In some embodiments processor 1602 may be a processor having integrated graphics, while in other embodiments processor 1602 may be a graphics core or cores.

Figure 17:
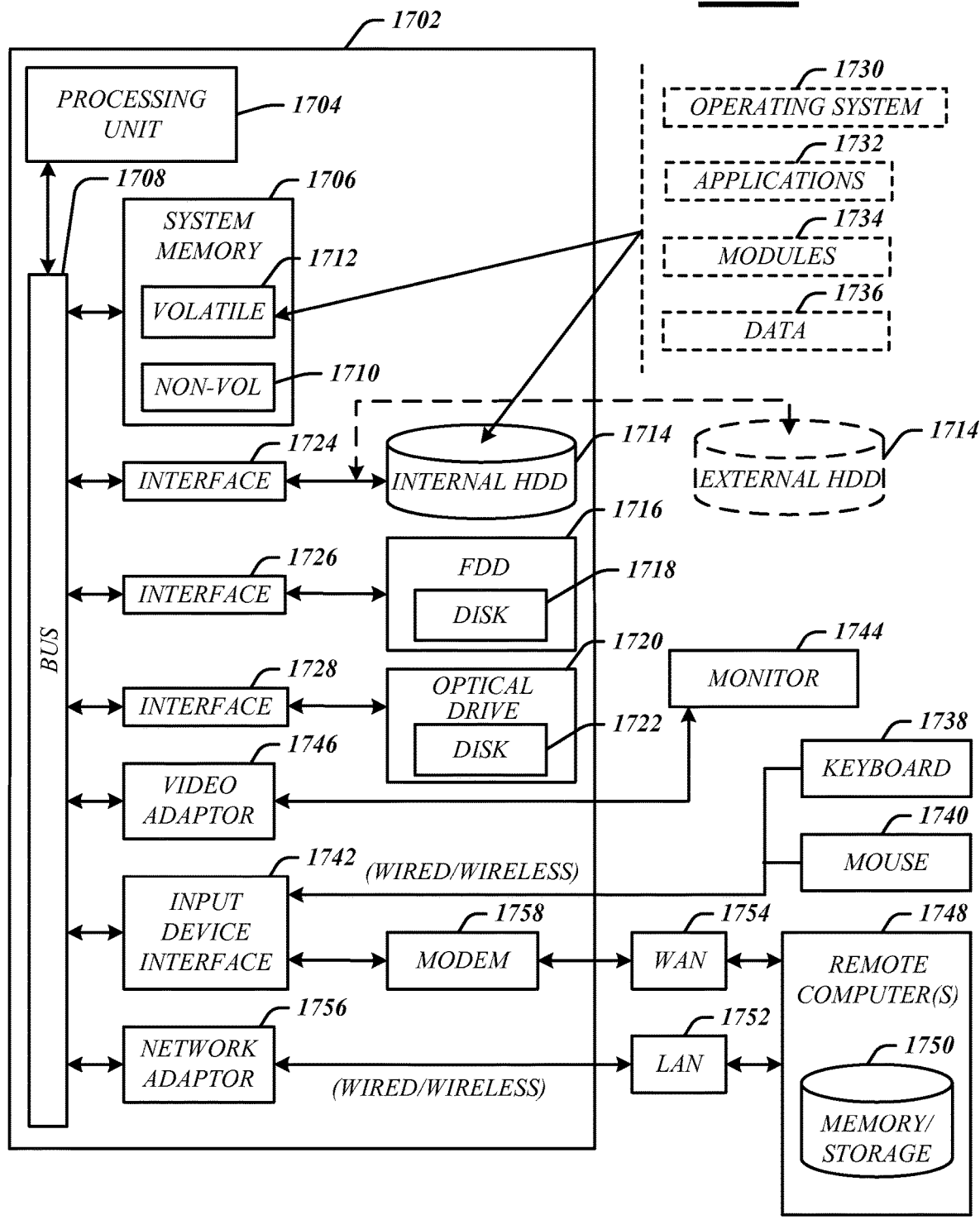
FIG. 17 illustrates an embodiment of an exemplary computing architecture.

FIG. 17 illustrates an embodiment of an exemplary computing system (architecture) 1700 suitable for implementing various embodiments as previously described. As used in this application, the terms "system" and "device" and "component" are intended to refer to a computer-related entity, either hardware, a combination of hardware and software, software, or software in execution, examples of which are provided by the exemplary computing architecture 1700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In one embodiment, the computing architecture 1700 may comprise or be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. The embodiments are not limited in this context.

The computing architecture 1700 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 1700.

As shown in FIG. 17, the computing architecture 1700 comprises a processing unit 1704, a system memory 1706 and a system bus 1708. The processing unit 1704 can be any of various commercially available processors. Dual microprocessors and other multi processor architectures may also be employed as the processing unit 1704. The system bus 1708 provides an interface for system components including, but not limited to, the system memory 1706 to the processing unit 1704. The system bus 1708 can be any of several types of bus structure that may further interconnect to a memory bus (with or without a memory controller), a peripheral bus, and a local bus using any of a variety of commercially available bus architectures.

The computing architecture 1700 may comprise or implement various articles of manufacture. An article of manufacture may comprise a computer-readable storage medium to store various forms of programming logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of programming logic may include executable computer program instructions implemented using any suitable type of code, such as source code, compiled code, interpreted code, executable code, static code, dynamic code, object-oriented code, visual code, and the like.

The system memory 1706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 17, the system memory 1706 can include non-volatile memory 1710 and/or volatile memory 1712. A basic input/output system (BIOS) can be stored in the non-volatile memory 1710.

The computer 1702 may include various types of computer-readable storage media in the form of one or more lower speed memory units, including an internal hard disk drive (HDD) 1714, a magnetic floppy disk drive (FDD) 1716 to read from or write to a removable magnetic disk 1718, and an optical disk drive 1720 to read from or write to a removable optical disk 1722 (e.g., a CD-ROM or DVD). The HDD 1714, FDD 1716 and optical disk drive 1720 can be connected to the system bus 1708 by a HDD interface 1724, an FDD interface 1726 and an optical drive interface 1728, respectively. The HDD interface 1724 for external drive implementations can include at least one or both of Universal Serial Bus (USB) and IEEE 1294 interface technologies.

The drives and associated computer-readable media provide volatile and/or nonvolatile storage of data, data structures, computer-executable instructions, and so forth. For example, a number of program modules can be stored in the drives and memory units 1710, 1712, including an operating system 1730, one or more application programs 1732, other program modules 1734, and program data 1736.

A user can enter commands and information into the computer 1702 through one or more wire/wireless input devices, for example, a keyboard 1738 and a pointing device, such as a mouse 1740. Other input devices may include a microphone, an infra-red (IR) remote control, a joystick, a game pad, a stylus pen, touch screen, or the like. These and other input devices are often connected to the processing unit 1704 through an input device interface 1742 that is coupled to the system bus 1708, but can be connected by other interfaces such as a parallel port, IEEE 1294 serial port, a game port, a USB port, an IR interface, and so forth.

A monitor 1744 or other type of display device is also connected to the system bus 1708 via an interface, such as a video adaptor 1746. In addition to the monitor 1744, a computer typically includes other peripheral output devices, such as speakers, printers, and so forth.

The computer 1702 may operate in a networked environment using logical connections via wire and/or wireless communications to one or more remote computers, such as a remote computer 1748. The remote computer 1748 can be a workstation, a server computer, a router, a personal computer, portable computer, microprocessor-based entertainment appliance, a peer device or other common network node, and typically includes many or all of the elements described relative to the computer 1702, although, for purposes of brevity, only a memory/storage device 1750 is illustrated. The logical connections depicted include wire/wireless connectivity to a local area network (LAN) 1752 and/or larger networks, for example, a wide area network (WAN) 1754. Such LAN and WAN networking environments are commonplace in offices and companies, and facilitate enterprise-wide computer networks, such as intranets, all of which may connect to a global communications network, for example, the Internet.

When used in a LAN networking environment, the computer 1702 is connected to the LAN 1752 through a wire and/or wireless communication network interface or adaptor 1756. The adaptor 1756 can facilitate wire and/or wireless communications to the LAN 1752, which may also include a wireless access point disposed thereon for communicating with the wireless functionality of the adaptor 1756.

When used in a WAN networking environment, the computer 1702 can include a modem 1758, or is connected to a communications server on the WAN 1754, or has other means for establishing communications over the WAN 1754, such as by way of the Internet. The modem 1758, which can be internal or external and a wire and/or wireless device, connects to the system bus 1708 via the input device interface 1742. In a networked environment, program modules depicted relative to the computer 1702, or portions thereof, can be stored in the remote memory/storage device 1750. It will be appreciated that the network connections shown are exemplary and other means of establishing a communications link between the computers can be used.

The computer 1702 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

The embodiments, as previously described, may be implemented using various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

In some embodiments, an element is defined as a specific structure performing one or more operations. For instance, the user equipment (UE) 102 may be an electronic device having one or more platform components as described with reference to FIGS. 16, 17. It may be appreciated, however, that any element defined as a specific structure performing a specific function may be expressed as a means or step for performing the specified function without the recital of structure, material, or acts in support thereof, and such means or step is meant to cover the corresponding structure, material, or acts described in the detailed description and equivalents thereof. The embodiments are not limited in this context.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
   at least one network interface;
   at least one memory; and
   logic, at least a portion of which is in hardware, the logic to:
   demodulate a received data packet;
   identify a mobile data application associated with the data packet;
   determine a content type of the data packet;
   prioritize the data packet based on the mobile data application associated with the data packet and the content type of the data packet; and determine whether to store the data packet for subsequent transmission based on a message type associated with the data packet.

2. The apparatus of claim 1, the logic to determine whether to delay a delivery of the data packet based on the mobile data application associated with the data packet.

3. The apparatus of claim 1, the mobile data application to comprise a social networking application.

4. The apparatus of claim 3, the logic to defer a push service for delivery of the data packet based on a determination that the mobile data application comprises the social networking application.

5. The apparatus of claim 1, the logic to determine whether to store the data packet for subsequent transmission in response to a determination that the data packet is associated with a keep-alive message type.

6. The apparatus of claim 1, the logic to determine to store the data packet for subsequent transmission in response to a determination that the data packet is associated with a status update message type.

7. The apparatus of claim 1, comprising at least one processor circuit.

8. At least one non-transitory computer-readable storage medium comprising a set of instructions that, in response to being executed on a computing device, cause the computing device to:
demodulate a received data packet;
identify a mobile data application associated with the data packet;
determine a content type of the data packet;
prioritize the data packet based on the mobile data application associated with the data packet and the content type of the data packet; and
determine whether to store the data packet for subsequent transmission based on a message type associated with the data packet.

9. The at least one non-transitory computer-readable storage medium of claim 8, comprising instructions that, in response to being executed on the computing device, cause the computing device to determine whether to delay a delivery of the data packet based on the mobile data application associated with the data packet.

10. The at least one non-transitory computer-readable storage medium of claim 8, the mobile data application to comprise a social networking application.

11. The at least one non-transitory computer-readable storage medium of claim 8, comprising instructions that, in response to being executed on the computing device, cause the computing device to defer a push service for delivery of the data packet based on a determination that the mobile data application comprises a social networking application.

12. The at least one non-transitory computer-readable storage medium of claim 8, comprising instructions that, in response to being executed on the computing device, cause the computing device to determine to store the data packet for subsequent transmission in response to a determination that the data packet is associated with a status update message type.

13. The at least one non-transitory computer-readable storage medium of claim 12, comprising instructions that, in response to being executed on the computing device, cause the computing device to aggregate the data packet for subsequent delivery with one or more additional status update messages.

14. The at least one non-transitory computer-readable storage medium of claim 8, comprising instructions that, in response to being executed on the computing device, cause the computing device to determine to store the data packet for subsequent transmission in response to a determination that the data packet is associated with a keep-alive message type.

15. The at least one non-transitory computer-readable storage medium of claim 8, comprising instructions that, in response to being executed on the computing device, cause the computing device to schedule the message for immediate delivery in response to a determination that the message type associated with the data packet does not comprise a keep-alive message type or a status update message type.

16. A method, comprising:
demodulating a received data packet;
identifying a mobile data application associated with the data packet;
determining a content type of the data packet;
prioritizing the data packet based on the mobile data application associated with the data packet and the content type of the data packet; and
determining whether to store the data packet for subsequent transmission based on a message type associated with the data packet.

17. The method of claim 16, comprising determining whether to delay a delivery of the data packet based on the mobile data application associated with the data packet.

18. The method of claim 16, the mobile data application to comprise a social networking application.

19. The method of claim 16, comprising deferring a push service for delivery of the data packet based on a determination that the mobile data application comprises a social networking application.

20. The method of claim 16, comprising determining to store the data packet for subsequent transmission in response to a determination that the data packet is associated with a status update message type.

21. The method of claim 20, comprising aggregating the data packet for subsequent delivery with one or more additional status update messages.

22. The method of claim 16, comprising determining to store the data packet for subsequent transmission in response to a determination that the data packet is associated with a keep-alive message type.

23. The method of claim 16, comprising scheduling the message for immediate delivery in response to a determination that the message type associated with the data packet does not comprise a keep-alive message type or a status update message type.

* * * * *